(12) United States Patent
Nam

(10) Patent No.: US 8,731,904 B2
(45) Date of Patent: May 20, 2014

(54) APPARATUS AND METHOD FOR EXTRACTING AND ANALYZING OPINION IN WEB DOCUMENT

(75) Inventor: Sang Hyob Nam, Pohang-si (KR)

(73) Assignee: Buzzni, Gyeonggi-Do (KR)

( * ) Notice: Subject to any disclaimer, the term of this patent is extended or adjusted under 35 U.S.C. 154(b) by 442 days.

(21) Appl. No.: 13/121,644

(22) PCT Filed: Sep. 23, 2009

(86) PCT No.: PCT/KR2009/005408
§ 371 (c)(1),
(2), (4) Date: Mar. 29, 2011

(87) PCT Pub. No.: WO2010/036013
PCT Pub. Date: Apr. 1, 2010

(65) Prior Publication Data
US 2011/0184729 A1 Jul. 28, 2011

(30) Foreign Application Priority Data

Sep. 29, 2008 (KR) ........................ 10-2008-0095330

(51) Int. Cl.
*G10L 15/00* (2013.01)
(52) U.S. Cl.
USPC ................................ 704/9; 704/251; 707/755
(58) Field of Classification Search
USPC ....................................... 704/9, 251; 707/755
See application file for complete search history.

(56) References Cited

U.S. PATENT DOCUMENTS

| 2008/0215571 | A1* | 9/2008 | Huang et al. ...................... 707/5 |
| 2012/0101808 | A1* | 4/2012 | Duong-Van ...................... 704/9 |
| 2013/0024183 | A1* | 1/2013 | Cardie et al. ...................... 704/8 |

FOREIGN PATENT DOCUMENTS

| JP | 2006-190229 A | 7/2006 |
| JP | 2007-172179 A | 7/2007 |

\* cited by examiner

*Primary Examiner* — Daniel D Abebe
(74) *Attorney, Agent, or Firm* — Nixon Peabody LLP; Joseph Bach, Esq.

(57) ABSTRACT

The present invention deals with an apparatus and method for extracting and analyzing opinions in web documents, wherein automatic extraction and analysis are performed effectively on user opinion information from web documents that are scattered across many websites on the Internet so that opinion search services may be easily implemented which enable search and statistical results to be checked as affirmative/negative opinions, and opinion search users can easily implement a system that helps in searching and monitoring the opinions of other users with respect to a specific keyword. In addition, according to the present invention, marketing representatives and stock inventors and corporate value assessors of each company can quickly check the opinions of many users about an applicable corporation and goods that exist on the vast Internet, and expenses that used to be spent on questionnaires and consulting companies to find opinions of existing users can be greatly reduced, and opinion extraction and statistics for each user can be effectively performed and utilized.

21 Claims, 7 Drawing Sheets

APPARATUS AND METHOD FOR EXTRACTING AND ANALYZING OPINION IN WEB DOCUMENT

CROSS-REFERENCE TO RELATED APPLICATIONS

This application is a National Phase of International Application No. PCT/KR2009/005408, which was filed on Sep. 23, 2009, and which claims priority to and the benefit of Korean Patent Application No. 10-2008-0095330, filed on Sep. 29, 2008, and the disclosures of which are hereby incorporated herein by reference in their entireties.

TECHNICAL FIELD

The present invention relates to an apparatus and method for extracting and analyzing an opinion in a web document, and more particularly, to an apparatus and method for extracting and analyzing an opinion in a web document wherein user opinion information is automatically extracted from web documents scattered across various websites on the Internet and analyzed so that an opinion search service which enables search and check of statistics according to affirmative/negative opinions can be simply provided, and a system which enables opinion search users to easily and quickly search and monitor opinions of other users about a specific keyword can be readily implemented.

BACKGROUND ART

As use of the Internet has been increasing lately, many people are posting their opinions on the Internet through media such as blogs and wikis. Also, the need to refer to opinion information uploaded by others on the Internet in order to evaluate specific information is increasing.

For example, there are various user opinions ranging from product reviews to movie reviews on the Internet. Such respective user opinions can be used when general users want other users' opinions before purchasing products or seeing movies, and also when marketers, stock traders, etc. want various opinions of general users about respective products or companies. In particular, general users tend to purchase a specific product after seeing other users' reviews.

However, opinions on the Internet are only in individual websites, and thus a user must manually search all the individual websites one by one to use the opinions.

It is difficult for users to search all such websites. Also, it is difficult to effectively search for other users' opinions through a general search because web documents with opinions, web documents with affirmative opinions, web documents with negative opinions, etc. coexist.

To solve this problem, active research on user opinion extraction technology is under way in Korean/international academic worlds. Also, an information search field has been remarkably developed since early 2000, and various techniques have been researched.

However, conventional information search technology merely provides a search service based only on information having a keyword, and cannot provide an advanced search service based on affirmative/negative evaluation content in documents or sentences containing each keyword. Recently, attempts have been made to apply user opinion extraction technology to information search, but the application still remains at a level of merely distinguishing affirmative and negative documents from each other.

Technical Problem

The present invention is directed to an apparatus and method for extracting and analyzing an opinion in a web document wherein user opinion information is automatically extracted from web documents scattered across various websites on the Internet and analyzed so that an opinion search service which enables search and check of statistics according to affirmative/negative opinions can be simply provided, and a system which enables opinion search users to easily and quickly search and monitor opinions of other users about a specific keyword can be readily implemented.

Technical Solution

According to an aspect of the present invention, there is provided an apparatus for extracting an opinion from a web document, including: a document collection module configured to collect specific web document data including opinion sentences; a language processing module configured to split the specific web document data collected by the document collection module according to sentences, and extract linguistic features by performing a language process on respective sentences; an opinion learning module configured to generate a specific opinion extraction model by applying a machine learning algorithm to the linguistic features of the respective sentences extracted by the language processing module; and one or more opinion extraction modules configured to probabilistically extract an opinion sentence from input web document data using the opinion extraction model generated by the opinion learning module.

Here, the apparatus may further include a domain classification module configured to classify the web document data input from the opinion extraction modules according to previously set domains and transfer the classified web document data to the respective opinion extraction modules.

The domain classification module may include: one or more document collectors configured to collect web document data relating to the previously set domains according to the previously set domains; one or more language processors configured to extract semantically-separable features by performing a language process on the collected domain-specific web document data; a domain classification learner configured to probabilistically learn the extracted domain-specific features using a machine learning classifier algorithm, and then generate a specific domain classification model; and a domain classifier configured to probabilistically classify the input web document data according to the previously set domains using the generated domain classification model.

Domain-specific web document data collected by each of the document collectors may consist of opinion data and fact data about the corresponding domain.

A ratio of the opinion data to the fact data may be uniformly maintained.

The language process may be morpheme analysis or a segmentation process.

When data having undergone the segmentation process is used, the language processors may extract features in at least one form among unigram, bigram, and trigram, and when data having undergone the morpheme analysis is used, the language processors may remove at least one of a postposition, affix, pre-final ending, and final ending determined to have no specific meaning through the morpheme analysis and then extract features in at least one form among unigram, bigram, and trigram.

According to another aspect of the present invention, there is provided an apparatus for analyzing an opinion in a web document, including: a language processing module configured to divide opinion sentences having evaluation results in specific web document data into semantic language units by performing a language process on the opinion sentences; an opinion expression arithmetic module configured to calculate a probability that each of the divided language units will be an affirmative/negative expression by normalization; an opinion expression marking module configured to compare the respective calculated language-unit-specific probabilities with a previously set opinion expression reference value, and mark the respective language units as affirmative/negative opinion expressions according to the comparison results; an opinion expression learning module configured to generate a specific opinion expression model by applying a machine learning algorithm to the opinion sentences in which the respective language units are marked as the affirmative/negative opinion expressions; and one or more opinion expression classification modules configured to perform a language process on an opinion sentence having an evaluation result of input web document data using the generated opinion expression model, and then mark and distinguish affirmative/negative opinion expressions.

Here, the apparatus may further include an opinion vocabulary storage module configured to store the language-unit-specific probabilities calculated by the opinion expression arithmetic module as a database (DB).

According to still another aspect of the present invention, there is provided an apparatus for extracting and analyzing an opinion in a web document, including: a document collection module configured to collect specific web document data including opinion sentences having evaluation results; a first language processing module configured to split the collected web document data according to sentences, and extract linguistic features by performing a language process on respective sentences; an opinion learning module configured to generate a specific opinion extraction model by applying a machine learning algorithm to the extracted linguistic features of the respective sentences; one or more opinion extraction modules configured to probabilistically extract an opinion sentence from input web document data using the generated opinion extraction model; a second language processing module configured to divide the opinion sentences having evaluation results into semantic language units by performing a language process on the opinion sentences; an opinion expression arithmetic module configured to calculate a probability that each of the divided language units will be an affirmative/negative expression by normalization; an opinion expression marking module configured to compare the respective calculated language-unit-specific probabilities with a previously set opinion expression reference value, and mark the respective language units as affirmative/negative opinion expressions according to the comparison results; an opinion expression learning module configured to generate a specific opinion expression model by applying a machine learning algorithm to the opinion sentences in which the respective language units are marked as the affirmative/negative opinion expressions; and one or more opinion expression classification modules configured to perform a language process on the opinion sentence having an evaluation result of the input web document data using the generated opinion expression model, and then mark and distinguish affirmative/negative opinion expressions.

According to yet another aspect of the present invention, there is provided a method of extracting an opinion from a web document, including: (a) collecting specific web document data including opinion sentences; (b) splitting the collected specific web document data according to sentences, and extracting linguistic features by performing a language process on respective sentences; (c) generating a specific opinion extraction model by applying a machine learning algorithm to the extracted linguistic features of the respective sentences; and (d) probabilistically extracting an opinion sentence from input web document data using the generated opinion extraction model.

The method may further include probabilistically classifying the web document data input in step (d) according to previously set domains.

Probabilistically classifying the web document data according to the previously set domains may include: a first step of collecting web document data relating to the previously set domains according to the previously set domains; a second step of extracting semantically-separable features by performing a language process on the collected domain-specific web document data; a third step of probabilistically learning the extracted domain-specific features using a machine learning classifier algorithm, and then generating a specific domain classification model; and a fourth step of probabilistically classifying the input web document data according to the previously set domains using the generated domain classification model.

The language process may be morpheme analysis or a segmentation process.

According to yet another aspect of the present invention, there is provided a method of analyzing an opinion in a web document, including: (a') dividing opinion sentences having evaluation results in specific web document data into semantic language units by performing a language process on the opinion sentences; (b') calculating a probability that each of the divided language units will be an affirmative/negative expression by normalization; (c') comparing the respective calculated language-unit-specific probabilities with a previously set opinion expression reference value, and marking the respective language units as affirmative/negative opinion expressions according to the comparison results; (d') generating a specific opinion expression model by applying a machine learning algorithm to the opinion sentences in which the respective language units are marked as the affirmative/negative opinion expressions; and (e') performing a language process on an opinion sentence having an evaluation result of input web document data using the generated opinion expression model, and then marking and distinguishing affirmative/negative opinion expressions.

The method may further include storing the language-unit-specific probabilities calculated in step (b') as a DB in a storage module.

According to yet another aspect of the present invention, there is provided a method of extracting and analyzing an opinion in a web document, including: (a") collecting specific web document data including opinion sentences having evaluation results; (b") splitting the collected web document data according to sentences, and extracting linguistic features by performing a language process on respective sentences; (c") generating a specific opinion extraction model by applying a machine learning algorithm to the extracted linguistic features of the respective sentences; (d") probabilistically extracting an opinion sentence from input web document data using the generated opinion extraction model; (e") dividing the opinion sentences having evaluation results into semantic language units by performing a language process on the opinion sentences; (f") calculating a probability that each of the divided language units will be an affirmative/negative expression by normalization; (g") comparing the respective calculated language-unit-specific probabilities with a previously set opinion expression reference value, and marking the respective language units as affirmative/negative opinion expressions according to the comparison results; (h") generating a specific opinion expression model by applying a machine learning algorithm to the opinion sentences in which the respective language units are marked as the affirmative/negative opinion expressions; and (i") performing a language process on the opinion sentence having an evaluation result of the input web document data using the generated opinion expression model, and then marking and distinguishing affirmative/negative opinion expressions.

According to yet another aspect of the present invention, there is provided a recording medium storing a program for executing the above-described method of extracting and analyzing an opinion in a web document.

Advantageous Effects

The above-described apparatus and method for extracting and analyzing an opinion in a web document according to an exemplary embodiment of the present invention automatically extract user opinion information from web documents scattered across various websites on the Internet and analyze the extracted user opinion information. Thus, it is possible to simply provide an opinion search service which enables search and check of statistics according to affirmative/negative opinions, and to readily implement a system which enables opinion search users to easily and quickly search and monitor opinions of other users about a specific keyword. Also, it is possible to remarkably reduce much time conventionally taken to search for other users' opinions.

The apparatus and method according to an exemplary embodiment of the present invention enable marketers, stock traders, firm valuators, etc. to quickly check various users' opinions about the corresponding company or products on the vast Internet, and can effectively extract opinions of respective users and develop and use statistics on the opinions while remarkably reducing the cost required for a consulting company or a survey conventionally carried out to know users' opinions.

MODE FOR INVENTION

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
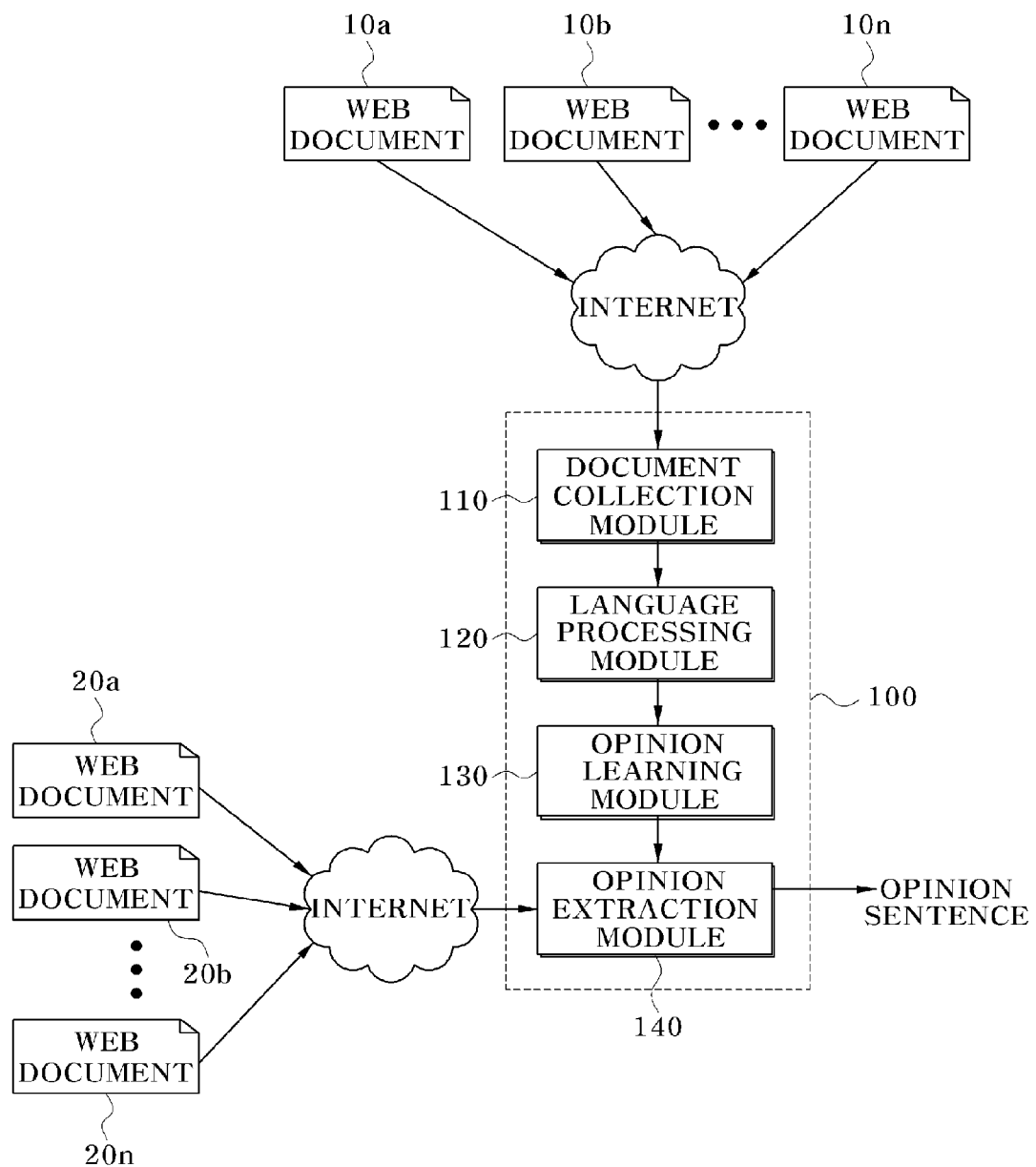
FIG. 1 is an overall block diagram of an apparatus for extracting an opinion from a web document according to an exemplary embodiment of the present invention.
Figure 2:
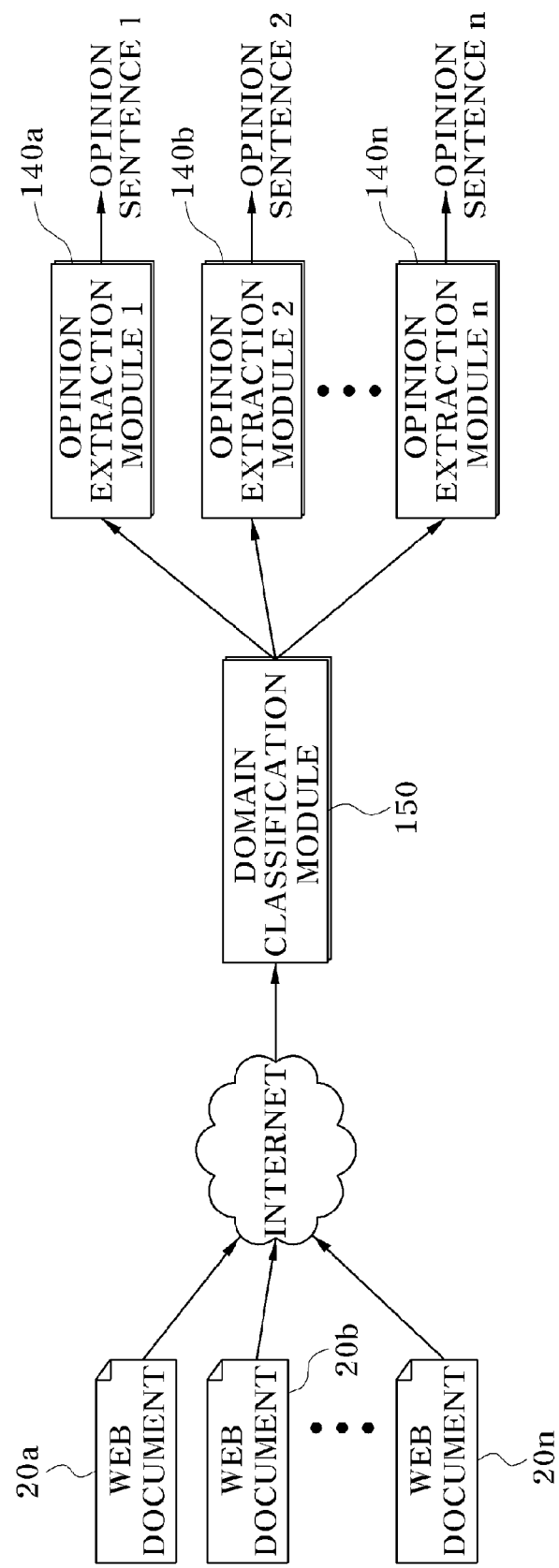
FIG. 2 is a schematic block diagram of an apparatus for extracting an opinion from a web document including a domain classification module applied to an exemplary embodiment of the present invention.
Figure 3:
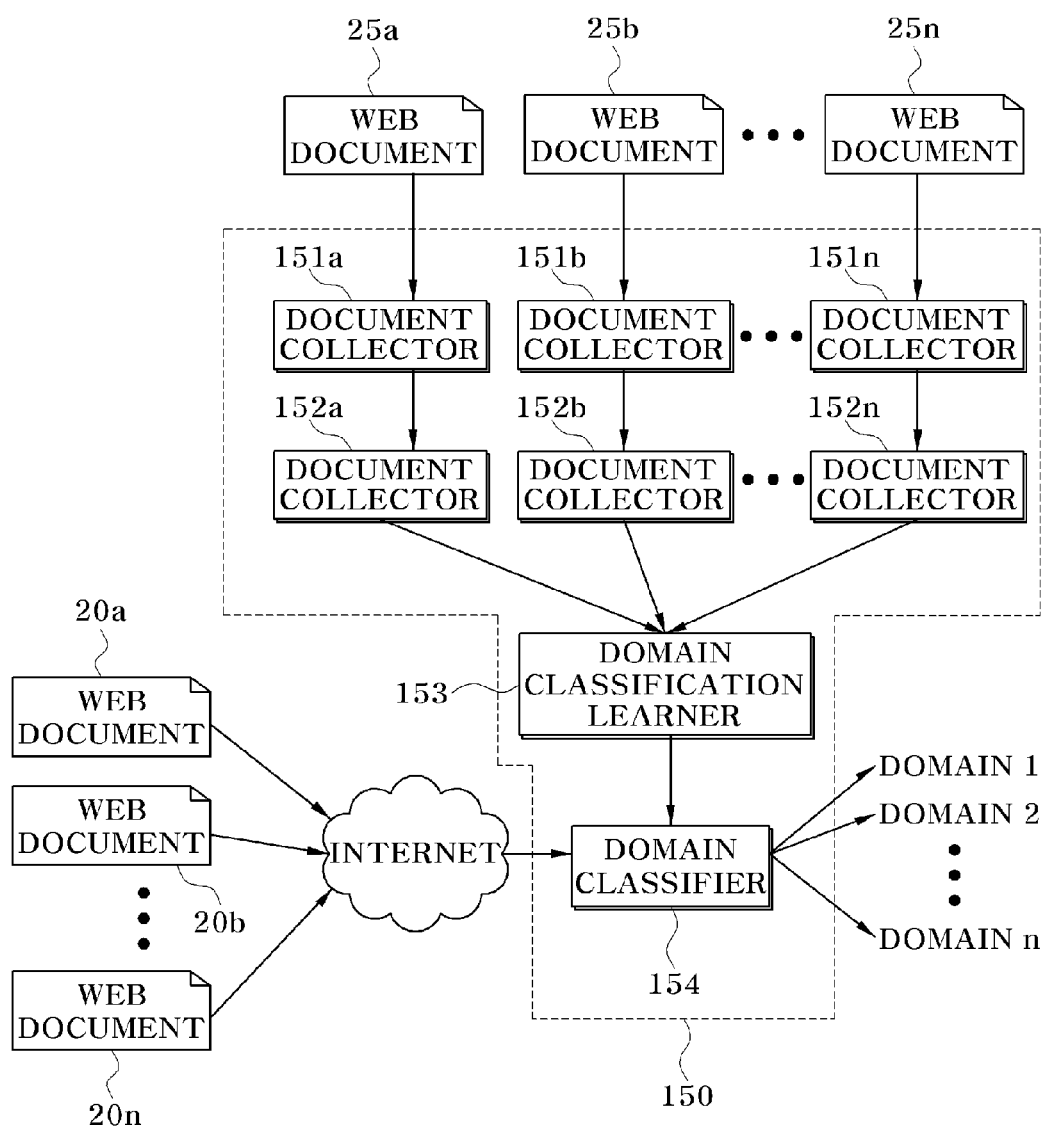
FIG. 3 is a block diagram of the domain classification module of FIG. 2.

FIG. 1 is an overall block diagram of an apparatus for extracting an opinion from a web document according to an exemplary embodiment of the present invention, FIG. 2 is a schematic block diagram of an apparatus for extracting an opinion from a web document including a domain classification module applied to an exemplary embodiment of the present invention, and FIG. 3 is a block diagram of the domain classification module of FIG. 2.

Referring to FIGS. 1 to 3, an apparatus 100 for extracting an opinion from a web document according to an exemplary embodiment of the present invention schematically includes a document collection module 110, a language processing module 120, an opinion learning module 130, an opinion extraction module 140, and so on.

The document collection module 110 functions to collect data of specific web documents 10a to 10n including opinion sentences on the Internet. In other words, the document collection module 110 downloads hypertext markup language (HTML) information of specific websites on the Internet in real time. Here, the web documents 10a to 10n denote specific web document data including opinion sentences randomly selected to generate a specific opinion learning model that will be described later.

The document collection module 110 may selectively collect web document data including opinion information data (i.e., general sentence/document data and information data in which affirmative/negative evaluations of the general sentence/document data are made), as shown in Table 1 below.

In a method of selectively collecting only web document data including opinion information data, specific web document data including opinion information data is selected, a web document selection model is generated using a machine learning algorithm (e.g., support vector machine (SVM), K-nearest neighbors (K-NN), and Bayesian) to be described later, and then only web document data including opinion information data can be selectively collected from all Internet web pages using the generated web document selection model.

Lately, the amount of review/opinion text about movies that users have seen, products that users have purchased, celebrities, national policies, etc. is drastically increasing. Data shown in Table 1 below corresponds to common comments about a movie.

As shown in Table 1, pairs of available data (a sentence/document, an affirmation/negation score) are significantly increasing. The increase of such web document data contributes greatly to the automatic construction of an opinion vocabulary dictionary and the development of an opinion extraction system.

TABLE 1

| Expression | Score | Opinion |
|---|---|---|
| ★★★★★ | 10 | Interesting report |
| ★★★★★ | 10 | A story of "smart" people's living report |
| ★★★★★ | 8 | Wise people reconstruct their daily lives! report |
| ★★★★★ | 9 | Mesmerized by the uncle's charm . . . report |
| ★★★★★ | 8 | A story of ordinary people rather than smart people report |

TABLE 1-continued

| Expression | Score | Opinion |
|---|---|---|
| ★★★★★ | 10 | Excellent acting, interesting content, and a heartwarming love story. How charming the uncle is ~???? report |
| ★★★★★ | 10 | It was a deeply touching story report |
| ★★★★★ | 10 | I saw it with little expectations, but the entire film warmed my heart. Also, it was interesting report |
| ★★★★ | 6 | It was warm and comic.. I felt like it was too short.. But, what if the uncle hadn't been there???? report |
| ★★★ | 5 | Repeat, repeat, repeat, and the same story after all. report |

Target data collected by the data collection module 110 is opinion information data, that is, general sentence/document data and information data in which affirmative/negative evaluations of the general sentence/document data are made, as shown in Table 1.

Here, the affirmative/negative evaluations may be expressed by scores within a predetermined range, or in various ways using stars (★) or other marks. In an exemplary embodiment of the present invention, all affirmative/negative evaluations expressed in various ways are recalculated within the same score range and used.

To be specific, when a score range used in an exemplary embodiment of the present invention is from a to b and a score range of collected data is from c to d, a collection score x is changed as shown in Equation 1 below.

$$PolarityScore(x) = (a-1) + \frac{x-c+1}{d-c+1} \times (b-a+1) \quad \text{Equation 1}$$

Assuming that a score of 1 to 10 (the closer to 10, the more affirmative) is used in an exemplary embodiment of the present invention and a score of 1 to 5 is used by collected data, when collected data has a score of 2, the score is changed as shown in Equation 2 below.

$$PolarityScore(2) = (1-1) - \frac{2-1+1}{5-1+1} \times (10-1+1) = 4 \quad \text{Equation 2}$$

Assuming that a score of 1 to 10 is used in an exemplary embodiment of the present invention and a score of 1 to 20 is used by collected data, the score is changed as shown in Equation 3 below.

$$PolarityScore(2) = (1-1) + \frac{2-1+1}{20-1+1} \times (10-1+1) = 1 \quad \text{Equation 3}$$

Data collected as described above becomes a set of the corresponding data sentence/text and opinion scores converted into a score used in an exemplary embodiment of the present invention, that is, {(data, score), (data, score), (data, score), (data, score)}.

Meanwhile, the Internet denotes a worldwide public computer network structure providing transmission control protocol/Internet protocol (TCP/IP) and various services of upper layers, such as hypertext transfer protocol (HTTP), telnet, file transfer protocol (FTP), domain name system (DNS), simple mail transfer protocol (SMTP), simple network management protocol (SNMP), network file service (NFS), and network information service (NIS). The Internet may be wired or wireless Internet, or a core network combined with a wired public network, a wireless mobile communication network, the mobile Internet, or so on.

The language processing module 120 functions to split the specific web document data collected by the document collection module 110 according to sentences, and to extract linguistic features by performing a language process on respective sentences.

Also, the language processing module 120 may split general document data (e.g., a text, Hangul, Word, or Excel document) as well as the specific web document data collected by the document collection module 110 according to sentences, and extract linguistic features by performing a language process on respective sentences.

Meanwhile, the general document data may include opinion and/or fact sentences previously set to generate an opinion extraction model whereby the corresponding data can be correctly determined as review data or fact data. Thus, limited web document data can be effectively complemented.

To be specific, a data set consisting of opinions and a data set only consisting of fact information are collected by the document collection module 110. Subsequently, the language processing module 120 extracts appropriate linguistic features by performing a language process, for example, morpheme analysis or segmentation.

Here, the segmentation is a process of dividing an input sentence into meaningful units. For example, an input sentence "나는 영화를 재밌게 봤다" is converted into a resultant sentence "나 는 영화 를 재밌 게 보 았 다."

The morpheme analysis is a process of finding which part of speech (POS) information each of the divided units has. For example, the input sentence "나는 영화를 재밌게 봤다" is converted into a resultant sentence "나 (CTP1; first person pronoun)+는 (fjb; auxiliary postposition)영화 (CMCN; non-predicative common noun)+를 (fcjo; objective postposition) 재밌 (YBDO; general verb)+기 (fmoca; auxiliary conjunctive ending)보 (YBDO; general verb)+았 (fmbtp; past-tense prefinal ending)+다 (fmofd; declarative final ending)."

The language process may be, for example, morpheme analysis or a segmentation process, and may also be postposition processing for extracting features (or indexes), processing of Korean inflection, processing for restoration of an original form, or so on.

The opinion learning module 130 functions to generate a specific opinion extraction model by applying a machine learning algorithm (e.g., naive Bayesian, SVM, and K-NN) to the linguistic features of the respective sentences extracted by the language processing module 120.

The opinion learning module 130 may be readily implemented using the above-mentioned common machine learning algorithms. In other words, using the linguistic features extracted by the language processing module 120, a common machine learning algorithm, for example, naive Bayesian, SVM, or K-NN, is selected to perform learning. When a sentence or document is input after the learning is finished, the opinion learning module 130 generates an opinion extraction model whereby the corresponding data can be determined to be opinion data or fact data.

Meanwhile, the sentences extracted by the language processing module 120 include sentences containing opinions and general sentences containing no opinion. Using the specific opinion extraction model generated by the opinion learning module 130, the sentences can be classified into the sentences containing opinions and the sentences containing no opinion.

The opinion extraction module 140 functions to probabilistically extract opinion sentences from data of input web documents 20a to 20n using the opinion extraction model generated by the opinion learning module 130. The opinion extraction module 140 may be implemented and prepared for web document data of each domain classified by a domain classification module 150 to be described below. Here, the web documents 20a to 20n denote all web document data on the Internet.

Additionally, the domain classification module 150 for classifying data of the web documents 20a to 20n input from the opinion extraction module 140 according to previously set domains and transferring the classified web document data to respective opinion extraction modules 140a to 140n may be included as shown in FIGS. 2 and 3.

The domain classification module 150 may include one or more document collectors 151a to 151n that collect data of the web documents 25a to 25n relating to previously set domains according to the previously set domains, one or more language processors 152a to 152n that extract semantically-separable features by performing a language process on the domain-specific web document data collected by the respective document collectors 151a to 151n, a domain classification learner 153 that probabilistically learns the domain-specific features extracted by the respective language processors 152a to 152n using a machine learning classifier algorithm and then generates a specific domain classification model, and a domain classifier 154 that probabilistically classifies the data of the input web documents 20a to 20n according to the previously set domains using the domain classification model generated by the domain classification learner 153. Here, the web documents 25a to 25n denote domain-specific web document data randomly selected to generate a specific domain classification model that will be described later.

To be specific, first, data relating to domains determined to be classified (e.g., movies, books, electronics, cosmetics, clothing, and persons) is collected by the respective document collectors 151a to 151n according to the respective domains to obtain data according to the domains.

At this time, data collected according to each domain consists of a combination of review data and fact data about the corresponding domain. All review-data-to-fact-data ratios of the data collected according to the respective domains are maintained to be the same or similar, so that the data can be classified according to only the domains.

Next, the respective language processors 152a to 152n perform a language process to extract appropriate features for the respective domains from the collected domain data. At this time, in the language process, the data is split into semantically-separable units by morpheme analysis, segmentation, or so on.

Meanwhile, features of the respective domains input to a machine learning model to be described later are as follows.

For example, when input data is "저자는 도서 A 에서 흥미진진하게 글을 구성하였다." in a domain relating to books, the data is converted by segmentation into "저자 는 도서 A 에서 흥미진진 하 게 글 을 구성하 였다.", and converted by morpheme analysis into "저자 (CTP3; third person pronoun)+는 (fjb; auxiliary postposition) 본기 (CMCN; non-predicative common noun) A(F; foreign letter) 에 (UM; estimated as uninflected word)+에서 (fjcao; general adverbial postposition) 흥미진진 (CMCPA; active-predicative common noun)+하 (fph; adjective-derivational affix)+게 (fmoca; auxiliary conjunctive ending) 글 (CMCN; non-predicative common noun)+을 (fjeo; objective postposition) 구성하 (CMCN; non-predicative common noun)+이 (fpd; verb-derivational affix)+였 (fmbtp; past-tense pre-final ending)+다 (fmofd; declarative final ending)+.(g; mark)."

When only the data having undergone segmentation is used, features of the domain are as follows.

①Unigram: 저자, 는, 도서, A, 에서, 흥미진진, 하, 게, 글, 을, 구성하, 였다, .
=>a b c d e->a, b, c, d, e Bigram: 저자 는, 는 도서, 도서 A, A 에서, 에서 흥미진진, 흥미 진진 하, 하 게, 게 글, 글 을, 을 구성하, 구성하 였다, 였다 .
=>a b c d e->a b, b c, c d, d e Trigram: 저자 는 도시, 는 도시 A, 도시 A 에시, A 에시 흥미진진, 에서 흥미진진 하, 흥미진진 하 게, 하 게 글, 게 글 을, 글 을 구성하, 을 구성하 였다, 구성하 였다 .
=>a b c d e->a b c, b c d, c d e Meanwhile, when the data having undergone morpheme analysis is used, features of the domain are as follows. In other words, after a postposition, affix, pre-final ending, final ending, etc. determined to have no specific meaning through morpheme analysis is removed, features in the form of unigram, bigram and trigram can be used, like the data having undergone segmentation.

Unigram: 저자, 도서, A, 흥미진진, 글, 구성하
Bigram: 저자 도시, 도시 A, A 흥미진진, 흥미진진 글, 글 구성하
Trigram: 저자 도서 A, 도서 A 흥미진진, A 흥미진진 글, 흥미진진 글 구성하

As mentioned above, all of the unigram, bigram, and trigram features may be used, or only a part of the features may be selectively used. In the latter case, a combination showing the highest performance in evaluation using review data is selected.

Subsequently, the domain classification learner 153 probabilistically learns the domain-specific features using, for example, naive Bayesian, SVM, K-NN, or another general machine learning classifier algorithm.

For example, a linear classifier can be expressed by Equation 4 below.

$$y = f(\vec{w} \cdot \vec{x}) = f\left(\sum_j w_j x_j\right) \qquad \text{Equation 4}$$

Here, $\vec{x}$ is an input data vector, which corresponds to selected unigram, bigram, and trigram input data in an exemplary embodiment of the present invention. The input data vector $\vec{x}$ is constructed using information such as a frequency, presence or absence, etc. of each feature.

A magnitude of the vector is the total number of features. Features not shown in the corresponding document have a value of 0, and features shown in the corresponding document have their frequencies or a value of 1.

Thus, $\vec{x}$ is expressed as a feature vector, for example, [0, 0, 1, 1, 0, 0, 0, 0, 0, 0, 1, . . . ].

Meanwhile, $\vec{w}$ is a weight vector, whereby weights are given to respective features according to respective classes. A matrix size is the number of types of the features×the number of the classes.

When learning is performed in this way, a value of $\vec{w}$ can be estimated. After the value of $\vec{w}$ is estimated, it is possible to know which class has the highest value by performing a matrix operation on $\vec{w}$ and $\vec{x}$ when $\vec{x}$ is input.

Also, in a machine learning classifier algorithm, data can be used as described above. To be specific, for example, a naive Bayesian classifier algorithm may be expressed by Equation 5 below.

$$p(C|F_1, \ldots, F_n) = \frac{p(C)p(F_1, \ldots, F_n|C)}{p(F_1, \ldots, F_n)} \quad \text{Equation 5}$$

Here, C denotes a class, which corresponds to a domain such as movies, books, and products. $F_i$ denotes each feature, which corresponds to, for example, a unigram (저자), a bigram (저자 도서), and a trigram (저자 도서 A).

P(C) is a probability of the class C occurring. For example, when the number of pieces of movie data is 5, that of pieces of book data is 12, and that of pieces of product data is 8, P(movie) is equal to "5/(5+12+8)."

$P(F_1, \ldots, F_n)$ is a probability of $F_1, \ldots,$ and $F_n$ simultaneously occurring. $P(F_1, \ldots, F_n)$ is applied to all classes as a denominator and thus can be omitted. $P(F_1, \ldots, F_n|C)$ is a probability that $F_1, \ldots,$ and $F_n$ will be generated when the class C is given.

Numerators whereby a class probability is substantially determined in Equation 5 above are calculated by Equation 6 below on the assumption that the respective features are conditionally independent from each other.

$$p(C, F_1, \ldots, F_n) = \quad \text{Equation 6}$$
$$p(C)p(F_1|C)p(F_2|C)p(F_3|C) \ldots = p(C)\prod_{i=1}^{n} p(F_i|C)$$

Here, $p(F_i|C)$ is a probability of $F_i$ when a C is given, which can be calculated as $$\frac{Freq(F_i|C)}{\sum_{i=j}^{n} Freq(F_j|C)}.$$

$Freq(F_j|C)$ denotes a frequency of a feature $F_j$ in the class C. The total number of the features is N.

By inputting the features to other machine learning classifier algorithms as well as the naive Bayesian classifier algorithm, a model whereby the class C is determined for input data can be generated.

Finally, when the learning is finished as described above, one domain classification model is generated. When a sentence or document is input thereafter, the domain classifier 154 probabilistically determines in which domain the corresponding data is included using the generated classification model.

Meanwhile, when a sentence or document is input while a domain classification model is actually used, features of the corresponding input data are selected in the same way as in the above example.

Subsequently, when features of the input data are input to the domain classification model, the domain classification model outputs the class C showing the highest generation probabilities of the features.

In an exemplary embodiment of the present invention, as mentioned above, a dictionary may be automatically constructed using the domain classification module 150 when opinions are extracted. Also, using the domain classification module 150, a learning model for an apparatus for analyzing opinions 200 according to an exemplary embodiment of the present invention to distinguish opinion expressions may be automatically generated.

Thus, when a learning model is generated by classifying data according to respective domains, a model for extracting opinions having performance optimized for a domain may be automatically generated.

A method of extracting an opinion from a web document according to an exemplary embodiment of the present invention will be described in detail below.

Figure 4:
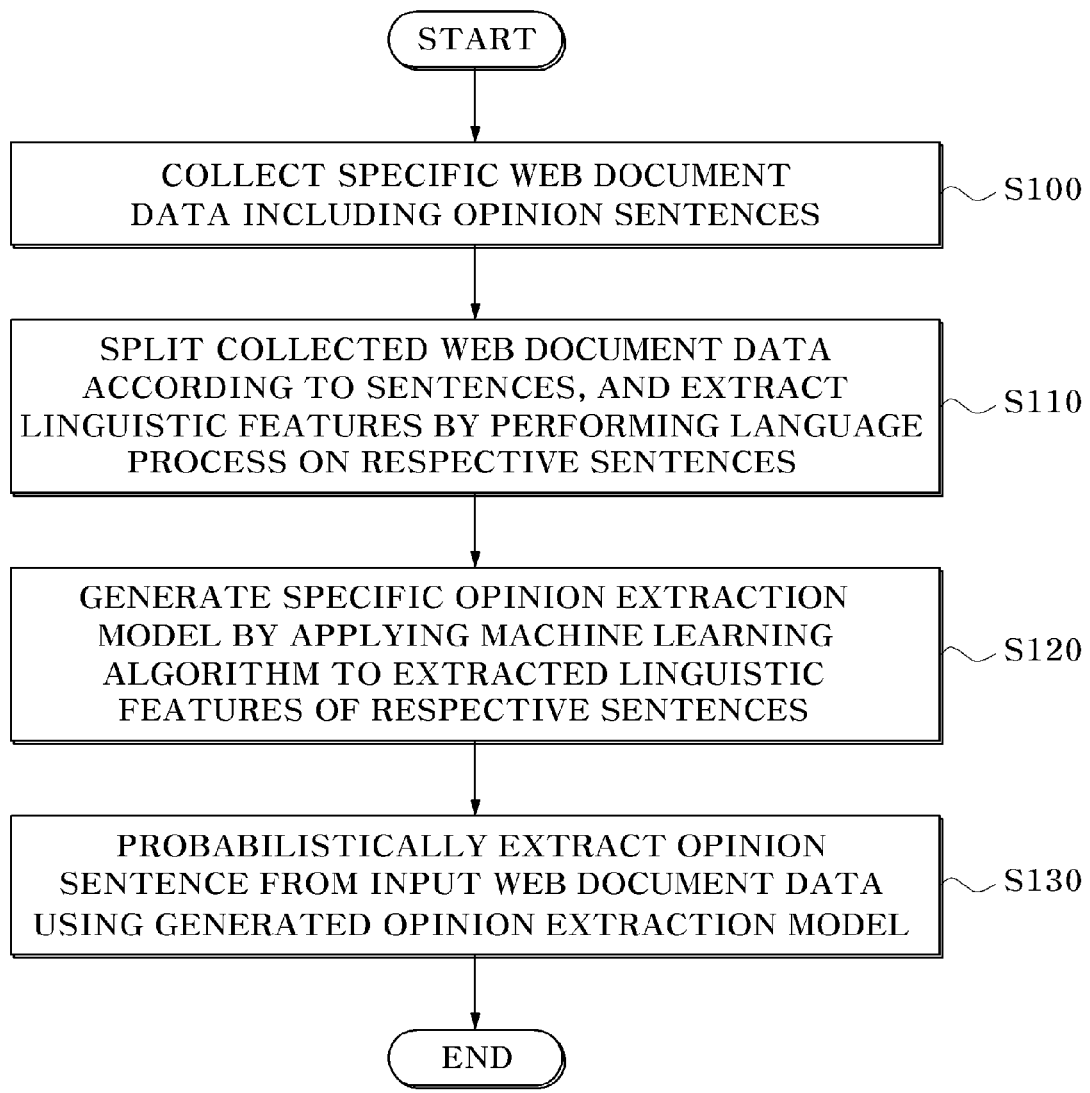
FIG. 4 is an overall flowchart illustrating a method of extracting an opinion from a web document according to an exemplary embodiment of the present invention.

FIG. 4 is an overall flowchart illustrating a method of extracting an opinion from a web document according to an exemplary embodiment of the present invention.

Referring to FIGS. 1 to 4, in a method of extracting an opinion from a web document according to an exemplary embodiment of the present invention, first, the document collection module 110 collects specific web document data including opinion sentences (S100), and then the language processing module 120 splits the specific web document data collected in step 100 and/or general document data according to sentences, and extracts linguistic features by performing a language process (e.g., morpheme analysis or segmentation) on respective sentences (S110).

Subsequently, the opinion learning module 130 generates a specific opinion extraction model by applying a machine learning algorithm to the linguistic features of the respective sentences extracted in step 110 (S120), and then the opinion extraction module 140 probabilistically extracts opinion sentences from data of the input web documents 20a to 20n using the opinion extraction model generated in step 120 (S130).

Additionally, the method may include a step in which the domain classification module 150 probabilistically classifies the data of the web documents 20a to 20n input in step 130 according to previously set domains.

The step in which the domain classification module 150 probabilistically classifies the data of the web documents 20a to 20n according to previously set domains may include a first step of collecting web document data relating to the previously set domains according to the previously set domains, a second step of extracting semantically-separable features by performing a language process (e.g., morpheme analysis or segmentation) on the collected domain-specific web document data, a third step of probabilistically learning the extracted domain-specific features using a machine learning classifier algorithm and then generating a specific domain classification model, and a fourth step of probabilistically classifying input web document data according to the previously set domains using the generated domain classification model.

Figure 5:
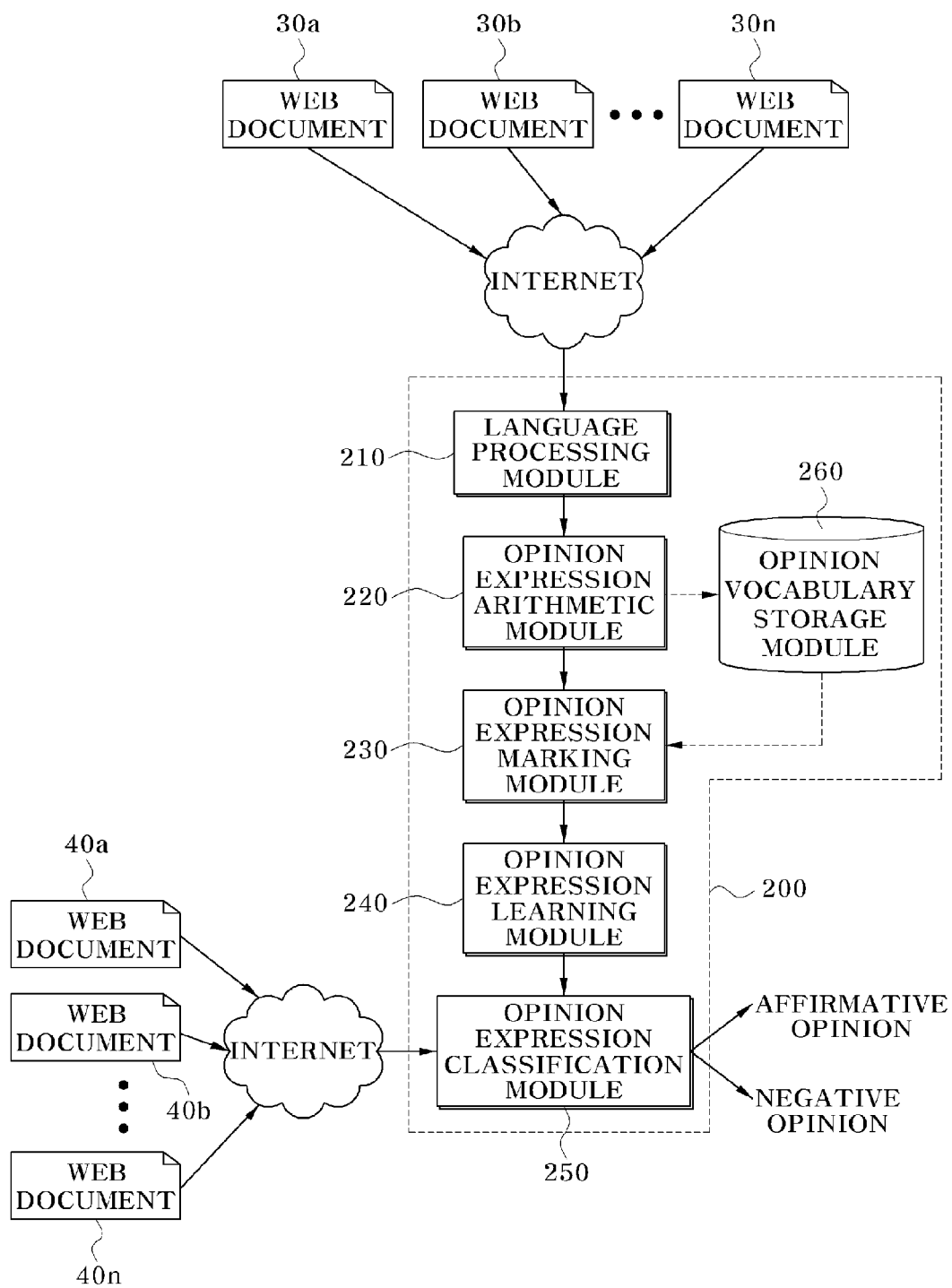
FIG. 5 is an overall block diagram of an apparatus for analyzing an opinion in a web document according to an exemplary embodiment of the present invention.
Figure 6:
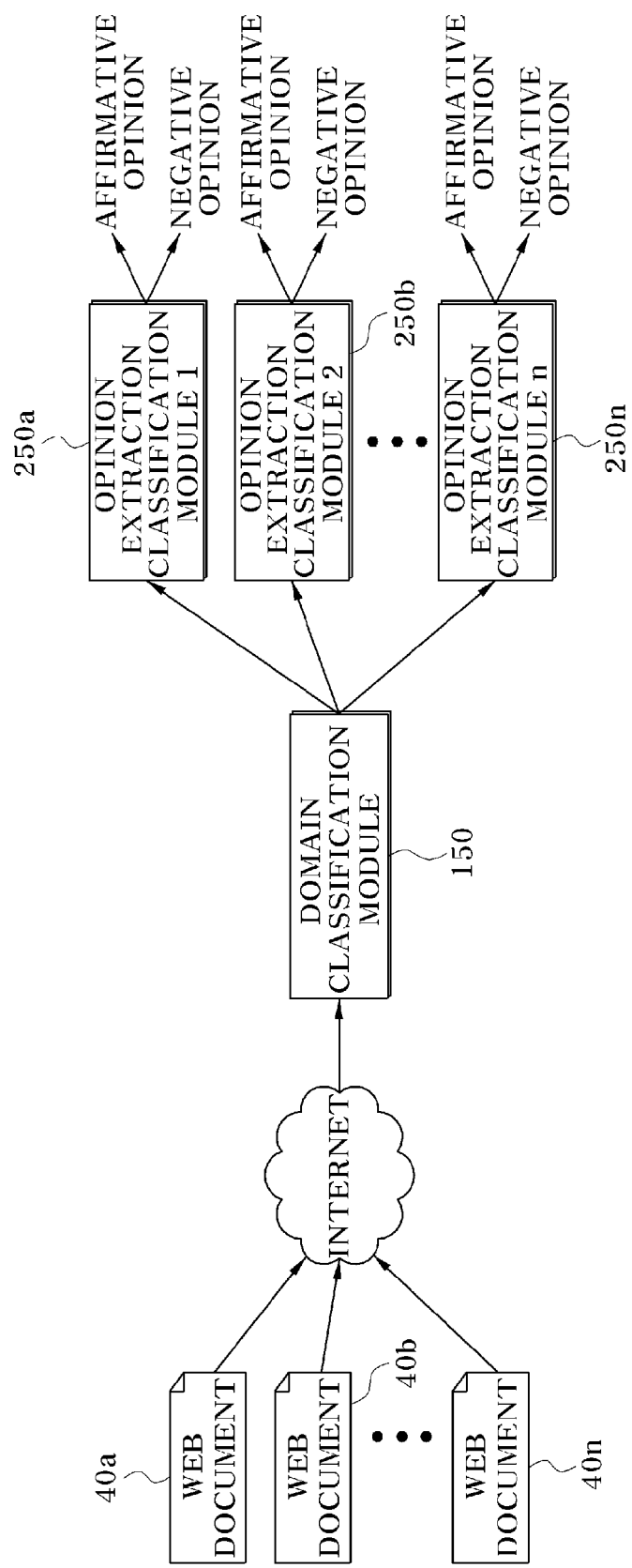
FIG. 6 is a schematic block diagram of an apparatus for analyzing an opinion in a web document including a domain classification module applied to an exemplary embodiment of the present invention.

FIG. 5 is an overall block diagram of an apparatus for analyzing an opinion in a web document according to an exemplary embodiment of the present invention, and FIG. 6 is a schematic block diagram of an apparatus for analyzing an opinion in a web document including a domain classification module applied to an exemplary embodiment of the present invention.

Referring to FIGS. 5 and 6, the apparatus 200 for analyzing an opinion in a web document according to an exemplary embodiment of the present invention schematically includes a language processing module 210, an opinion expression arithmetic module 220, an opinion expression marking module 230, an opinion expression learning module 240, an opinion expression classification module 250, and so on.

The language processing module 210 splits opinion sentences having evaluation results in data of specific web documents 30a to 30n into semantic language units by performing a language process (e.g., morpheme analysis or segmentation) on the opinion sentences. Here, the web documents 30a to 30n denote specific web document data randomly selected to generate a specific opinion expression model that will be described later.

To be specific, various kinds of reviews such as movie reviews, product reviews, and book reviews are on the Internet. In these reviews, evaluation results are generally posted together with review sentences.

For example, 10 points may be given with a comment "This movie is the greatest masterpiece," or 1 point may be given with a comment "This movie is pure rubbish." In an exemplary embodiment of the present invention, the opinion expression arithmetic module 220 to be described later calculates affirmative scores and negative scores of respective semantic units on the basis of such review data, and automatically stores the calculated scores in an opinion vocabulary storage module 260.

When input sentences are "이 영화는 정말 재밌었다" –10 points, "이번에 본기는 꽤 재밌었다" –9 points, "내 생애 최고로 재밌었던 영화" –9 points], the sentences are divided into language units through the language process as follows: ["이"(SGR; demonstrative determiner)영화(CMCN; non-predicative common noun)+는 (fjb; auxiliary postposition) 정말 (SBO; general adverb)재밌(YBDO; general verb) 었(fmbtp; past-tense pre-final ending)+다 (fmofd; declarative final ending)"–10 points, "이번(CMCN; non-predicative common noun)+에(fjcao; general adverbial postposition) 본기(CMCN; non-predicative common noun)+는 (fjb; auxiliary postposition) 꽤 (SBO; general adverb) 재밌 (YBDO; general verb)+었(fmbtp; past-tense pre-final ending)+다 (fmofd; declarative final ending)"–9 points, and "내 (CTP1; first person pronoun)+에(fjcao; general adverbial postposition) 생애 (CMCN; non-predicative common noun)최고 (CMCN; non-predicative common noun)+로 (fjcao; general adverbial postposition) 재밌 (YBDO; general verb)+었(fmbtp; past-tense pre-final ending)+던 (fmotgp; past-tense adnominalizing ending)영화 (CMCN; non-predicative common noun)"–9 points].

The opinion expression arithmetic module 220 functions to calculate a probability that each of the language units divided by the language processing module 210 will be an affirmative/negative expression by normalization.

For example, input data consists of scores denoting the degrees of affirmation and sentences/documents corresponding to the scores as shown below. The review data is collected from review sites on which users post affirmative/negative scores and opinions in a general web, as mentioned above.

[1 point—["A를 봤는데 지루했다", "B는 최악이나", ...],
2 points—["C를 봤는데 실망이었다", "D는 졸작이나", ...],
9 points—["E를 봤는데 흥미진진했다", "F는 수작이다", ...],
10 points—["G는 최고의 영화이나", "H는 세계 최고의 영화이다", ...].]

As mentioned above, the data undergoes segmentation and language-specific morpheme analysis (this can be applied to other languages in the same way). Then, the review data is converted as follows.

[A(F; foreign letter)+를 (fjco; objective postposition)+ 보 (YBDO; general verb)+았(fmbtp; past-tense pre-final ending)+는데(fmocs; subordinate conjunctive ending)+ 지루 (CMCPA; active-predicative common noun)+하 (fph; adjective-derivational affix)+었(fmbtp; past-tense pre-final ending)+다 (fmofd; declarative final ending), B(F; foreign letter)+는 (fjb; auxiliary postposition)+최악(CMCPS; stative-predicative common noun)+이 (fpd; verb-derivational affix)+나 (fmofd; declarative final ending), C(F; foreign letter)+를 (fjco; objective postposition)+ 보 (YBDO; general verb)+았(fmbtp; past-tense pre-final ending)+는데(fmocs; subordinate conjunctive ending)+ 실망 (CMCPA; active-predicative common noun)+이 (fpd; verb-derivational affix)+었(fmbtp; past-tense pre-final ending)+다 (fmofd; declarative final ending), D(F; foreign letter)+는 (fjb; auxiliary postposition)+졸작 (CMCN; non-predicative common noun)+이 (fpd; verb-derivational affix)+ 나 (fmofd; declarative final ending), E(F; foreign letter)+를 (fjco; objective postposition)+ 보 (YBDO; general verb)+았(fmbtp; past-tense pre-final ending)+는데(fmocs; subordinate conjunctive ending)+ 흥미진진(CMCN; non-predicative common noun)+ 하 (YBDO; general verb)+었(fmbtp; past-tense pre-final ending)+다 (fmofd; declarative final ending), F(F; foreign letter)+는 (fjb; auxiliary postposition)+수작 (CMCPA; active-predicative common noun)+이 (fpd; verb-derivational affix)+ 다 (fmofd; declarative final ending), G(F; foreign letter)+는 (fjb; auxiliary postposition)+ 최고 (CMCN; non-predicative common noun)+의 (fjcg; adnominal postposition)+영화 (CMCN; non-predicative common noun)+이 (fpd; verb-derivational affix)+나 (fmofd; declarative final ending), H(F; foreign letter)+는 (fjb; auxiliary postposition)+세계 (CMCN; non-predicative common noun)+최고 (CMCN; non-predicative common noun)+ 의 (fjcg; adnominal postposition)+영화 (CMCN; non-predicative common noun)+이 (fpd; verb-derivational affix)+ 나 (fmofd; declarative final ending)]

Next, the opinion expression arithmetic module 220 obtains affirmation/negation values of the respective language units using review data having undergone such a language process.

For example, which degree of affirmation/negation "최고 (CMCN; non-predicative common noun)" denotes, and how "최고 (CMCN; non-predicative common noun)" is distributed to respective scores (1 to 10) are probabilistically calculated by Equation 7 below.

In Equation 7 below, $w_j$ is "최고 (CMCN; non-predicative common noun)." In this way, $w_j$ may denote a combination of a word and the corresponding POS information, or only one word "최고" without the POS information.

In other words, when the same number of pieces of data are in all the scores of 1 to 10, an affirmation/negation value of each language unit is calculated by Equation 7 below.

$$Score(w_j) = \frac{\sum_{s_i \in S}[Score(s_i) \times Freq(w_j, s_i)]}{\sum_{s_i \in S} Freq(w_j, s_i)} \quad \text{Equation 7}$$

Here, S denotes a set of all scores. For example, when movie reviews have 1 to 10 points, S denotes a set of sentences scored 1 to 10 points. $Score(s_i)$ denotes an actual score of the corresponding score set. In other words, $Score(s_i)$ of a 10-point score set is 10.

Score($w_j$) denotes an affirmative/negative score of $w_j$. Freq($w_j$,$s_i$) denotes a frequency with which the word $w_j$ is shown in a score set $s_i$.

$$\sum_{s_i \in S} Freq(w_j, s_i)$$

is the sum frequencies with which the word $w_j$ is shown in all score sets, that is, a frequency with which $w_j$ is shown in all data.

A score of a word may be simply calculated as an average by Equation 7 above. For example, when there are only two 10-point sentences including "재밌" and two 9-point sentences including "재밌," a score of the word "재밌" may be calculated as shown in Equation 8 below.

$$Score(재밌 - YBDO) = \frac{10 \times Freq(재밌 - YBDO, s_{10}) + 9 \times Freq(재밌 - YBDO, s_9)}{Freq(재밌 - YBDO, s_{10}) + Freq(재밌 - YBDO, s_9)}$$

$$= \frac{10 \times 1 + 9 \times 2}{1 + 2}$$

$$= 9.333$$

Equation 8

Here, one semantic unit may be a combination of "재밌" and a morpheme "YBDO," or the word "재밌" only.

Meanwhile, it is uncommon in reality for the same number of sentences to belong to all scores. When an average is applied to an environment having 100,000 pieces of 10-point data and 10,000 pieces of 1-point data, as shown above, a word, such as "영화," frequently shown in sentences of all scores is determined as a considerably affirmative word close to 10 points only because there are many pieces of 10-point data.

For example, when the keyword "영화" is shown 50,000 times in 100,000 10-point sentences and 5,000 times in 10,000 1-point sentences, a score of the keyword "영화" can be calculated as shown in Equation 9 below.

$$Score(영화 - CMCN) = \frac{10 \times 50000 + 1 \times 5000}{50000 + 5000} = 9.1818$$

Equation 9

In common sense, the keyword "영화" has a score of 5 or so. However, because the keyword "영화" is shown in 10-point sentences and 1-point sentences at the same ratio, the above-mentioned problem occurs. Thus, Equation 10 below is required in consideration of the number of pieces of data corresponding to the respective scores.

$$Score(w_j) = \frac{\sum_{s_i \in S}[Score(s_i) \times P(w_j | s_i)]}{\sum_{s_i \in S} P(w_j | s_i)}$$

$$P(w_j | s_i) = \frac{Freq(w_j, s_i)}{\sum_{w_k \in W} Freq(w_k, s_i)}$$

Equation 10

Here, $P(w_j|s_i)$ is a probability that $w_j$ will be shown in a score set $s_i$. For this, a frequency of $w_j$ in $s_i$ is divided by the total number of words in $s_i$, $$\sum_{s_i \in S} Freq(w_j, s_i).$$

By applying Equation 10 to the problematic situation mentioned above in which the keyword "영화" is shown 50,000 times in 100,000 10-point sentences and 5,000 times in 10,000 1-point sentences, a score of the keyword "영화" can be calculated as shown in Equation 11 below.

$$P(영화 - CMCN | s_{10}) = \frac{Freq(영화 - CMCN, s_{10})}{\sum_{w_k \in W} Freq(w_k, s_{10})}$$

$$= \frac{50000}{100000}$$

$$= 0.5$$

Equation 11

$$P(영화 - CMCN | s_1) = \frac{Freq(영화 - CMCN, s_1)}{\sum_{w_k \in W} Freq(w_k, s_1)}$$

$$= \frac{5000}{10000}$$

$$= 0.5$$

$$Score(영화 - CMCN) = \frac{\sum_{s_i \in S} Score(s_i) \times P(w_j | s_i)}{\sum_{s_i \in S} P(w_j | s_i)}$$

$$= \frac{10 \times 0.5 + 1 \times 0.5}{0.5 + 0.5}$$

$$= 5.5$$

As mentioned above, by performing normalization using a probability that a word will be shown in sentences of each score, the problem of a score being biased according to the corresponding scores is solved.

Next, affirmative/negative scores of respective semantic units are calculated as described above and stored in the opinion vocabulary storage module 260.

The opinion expression marking module 230 functions to compare respective language-unit-specific probabilities calculated by the opinion expression arithmetic module 220 or stored in the opinion vocabulary storage module 260 with a previously set opinion expression reference value, and to mark each language unit as an affirmative opinion expression when the probability is the previously set opinion expression reference value or more and as a negative value when the probability is less than the previously set opinion expression reference value.

To be specific, when input sentences are, for example, 이(SGR; demonstrative determiner) 영화 (CMCN; non-predicative common noun)+는 (fjb; auxiliary postposition) 정말 (SBO; general adverb) 재밌 (YBDO; general verb) 었 (fmbtp; past-tense pre-final ending)+다 (fmofd; declarative final ending)–10 points, 이번 (CMCN; a non-predicative common noun)+에 (fjcao; general adverbial postposition) 분기 (CMCN; non-predicative common noun)+는 (fjb; auxiliary postposition) (SBO; general adverb) 재밌 (YBDO; general verb)+었 (fmbtp; past-tense pre-final ending)+다 (fmofd; declarative final ending)—9 points, 나 (CTP1; first person pronoun)+에 (fjcao; general adverbial postposition) 생애 (CMCN; non-predicative common noun) 최고 (CMCN; non-predicative common noun)+로 (fjcao; general adverbial postposition)재밌(YBDO; general verb)+었(fmbtp; past-tense pre-final ending)+던 (fmotgp; past-tense adnominalizing ending)영화 (CMCN; non-predicative common noun)–9 points, and 이 (SGR; demonstrative determiner)영화 (CMCN; non-predicative common noun)+는 (fjb; auxiliary postposition) 재밌 (YBDO; general verb)+지(fmoca; auxiliary conjunctive ending)+않(YA; auxiliary verb)+었(fmbtp; past-tense pre-final ending)+다 (fmofd; declarative final ending)+.(g; mark)—1 point], the sentences are expressed as affirmative/negative opinions as follows.

[이 (SGR; demonstrative determiner)/NEUTRAL 영화 (CMCN; non-predicative common noun)/NEUTRAL+ 는 (fjb; auxiliary postposition)/NEUTRAL 정말 (SBO; general adverb)/NEUTRAL 재밌 (YBDO; general verb)/POSITIVE+었(fmbtp; past-tense pre-final ending)/NEUTRAL+ 다 (fmofd; declarative final ending)/NEUTRAL—10 points, 이번 (CMCN; non-predicative common noun)/NEUTRAL+에(ficao; general adverbial postposition)/NEUTRAL본기(CMCN; non-predicative common noun)/NEUTRAL+는 (fjb; auxiliary postposition)/NEUTRAL 꽤 (SBO; general adverb)/NEUTRAL 재밌 (YBDO; general verb)/POSITIVE+었(fmbtp; past-tense pre-final ending)/NEUTRAL+다 (fmofd; declarative final ending)/NEUTRAL—9 points, 다 (CTP1; first person pronoun)/NEUTRAL+에(fjcao; general adverbial postposition)/NEUTRAL생애 (CMCN; non-predicative common noun)/NEUTRAL최고 (CMCN; non-predicative common noun)/POSITIVE+로 (fjcao; general adverbial postposition)/NEUTRAL 재밌 (YBDO; general verb)/POSITIVE+었(fmbtp; past-tense pre-final ending)/NEUTRAL+던 (fmotgp; past-tense adnominalizing ending)/NEUTRAL영화 (CMCN; non-predicative common noun)/NEUTRAL–9 points, and 이 (SGR; demonstrative determiner)/NEUTRAL 영화 (CMCN; non-predicative common noun)/NEUTRAL+ 는 (fjb; auxiliary postposition)/NEUTRAL 재밌 (YBDO; general verb)/POSITIVE+지(fmoca; auxiliary conjunctive ending)/NEUTRAL+않(YA; an auxiliary verb)/NEGATIVE+었(fmbtp; past-tense pre-final ending)/NEUTRAL+ 다 (fmofd; declarative final ending)/NEUTRAL+.(g; mark)/NEUTRAL]

Among words stored in the opinion vocabulary storage module 260, words having a specific score or more in a range from 1 point to 10 points are considered affirmative words, and words having less than the specific score are considered negative words.

In the example above, "재밌 (YBDO; general verb)" is considered an affirmative word, and "않 (YA; auxiliary verb)" is considered a negative word.

In, affirmative/negative words coexist, and it is difficult to determine whether to mark the whole sentence as affirmation or negation. Such a case frequently occurs in the next step, and thus the opinion expression classification module 250 is implemented using an opinion expression classification model. In other words, the opinion expression classification module 250 serves to detect and mark a portion corresponding to a detailed opinion as mentioned above when a sentence is input.

Meanwhile, a portion marked as an opinion word may be directly marked according to whether the corresponding word is affirmative or negative as mentioned above, or affirmative/negative words may be marked using information about whether the corresponding sentence is an affirmative sentence or negative sentence.

For example, when sentence belongs to a 1-point sentence set, sentence is clearly a negative sentence. Using the information that sentence is a negative sentence, all affirmative/negative words in sentence are marked as negative words. In other words, sentence is marked as follows.

이 (SGR; demonstrative determiner)/NEUTRAL 영화 (CMCN; non-predicative common noun)/NEUTRAL+ 는 (fjb; auxiliary postposition)/NEUTRAL 재밌 (YBDO; general verb)/NEGATIVE+ 지(fmoca; auxiliary conjunctive ending)/NEUTRAL+않(YA; auxiliary verb)/NEGATIVE+ 었(fmbtp; past-tense pre-final ending)/NEUTRAL+다 (fmofd; declarative final ending)/NEUTRAL+.(g; mark)/NEUTRAL The opinion expression learning module 240 functions to generate a specific opinion expression model by applying a machine learning algorithm to opinion sentences in which respective language units are marked as affirmative/negative opinion expressions by the opinion expression marking module 230.

The opinion expression classification module 250 functions to performs a language process (e.g., morpheme analysis or segmentation) on sentences having evaluation results of data of input web documents 40a to 40n using the opinion expression model generated by the opinion expression learning module 240, and then to mark and distinguish affirmative/negative opinion expressions. Here, the web documents 40a to 40n denote all web document data on the Internet.

To be specific, learning is performed to implement the opinion expression classification module 250 using the sentences in which affirmative/negative opinion expressions are marked by the opinion expression marking module 230. At this time, a model used for learning is, for example, hidden Markov model (HMM), maximum entropy model (ME), conditional random field (CRF), Struct-SVM, or other machine learning algorithms.

Data input in common from such machine learning algorithm models is $(x_1,y_1), \ldots,$ and $(x_n,y_n)$. x is a semantic unit, and can be 재밌 (YBDO; general verb)," "재밌," "YBDO; general verb," and so on. y is a label that the corresponding semantic unit can have, and can be "Positive," "Negative," "Neutral," etc. shown above as examples. Also, another label aiding in determining affirmation/negation, such as "Strength," may be added.

In other words, a model desired in an exemplary embodiment of the present invention is a model for estimating a label y attached to input data sequences x. When the data $(x_1,y_1), \ldots,$ and $(x_n,y_n)$ is given as an input, the above-mentioned machine learning algorithm models estimate which label $y_i$ of $x_i$ comes under a specific condition using $(x_{i-1},y_{i-1})$ and $(x_{i+1},y_{i+1})$ in front of and behind $x_i$ at a specific position, $(x_{i-2},y_{i-2})$ and $(x_{i+2},y_{i+2})$ in front of and behind and $(x_{i-1},y_{i-1})$, and $(x_{i+1},y_{i+1})$, peripheral data continuously expanding in this way together with information about another feature (a POS, a capital letter, an emoticon, etc.) at the position.

When learning is performed using a model as described above, a specific opinion expression model is generated. Then, when a data sequence $x_i$ is input, the opinion expression classification module 250 estimates which label sequence $y_i$ is generated for the data sequence $x_i$ using the generated opinion expression model.

When a sentence is input, a language process such as segmentation or morpheme analysis is selectively performed as described below. Subsequently, when the processed data is input to the opinion expression classification module 250, the data may be expressed as follows.

For example, when an input sentence is "이 (SGR; demonstrative determiner)영화 (CMCN; non-predicative common noun)+는 (fjb; auxiliary postposition)재밌 (YBDO; general verb)+지(fmoca; auxiliary conjunctive ending)+않 (YA; auxiliary verb)+었(fmbtp; past-tense pre-final ending)+다 (fmofd; declarative final ending)+.(g; mark)–1 point," a sentence in which affirmative/negative opinion expressions are classified is expressed as "이 (SGR; demonstrative determiner)/NEUTRAL영화 (CMCN; non-predicative common noun)/NEUTRAL+는 (fjb; auxiliary postposition)/NEUTRAL재밌 (YBDO; general verb)/NEGATIVE+지(fmoca; auxiliary conjunctive ending)/NEGATIVE+않 (YA; auxiliary verb)/NEGATIVE+었(fmbtp; past-tense pre-final ending)/NEUTRAL+다 (fmofd; declarative final ending)/NEUTRAL+.(g; mark)/NEUTRAL."

Here, when opinion words having the same polarity are successively shown in the sentence, the opinion words are considered one opinion expression. Also, when "POSITIVE" and "NEGATIVE" expressions are mainly used for marking, "NEUTRAL" is removed.

In other words, the sentence is expressed as "이 (SGR; demonstrative determiner)영화 (CMCN; non-predicative common noun)는 (fjb; auxiliary postposition) <NEGATIVE>재밌 (YBDO; general verb)+지(fmoca; auxiliary conjunctive ending)않(YA; auxiliary verb)</NEGATIVE>+었(fmbtp; past-tense pre-final ending)+다 (fmofd; declarative final ending)+.(g; mark)."

Here, <NEGATIVE> denotes a start of an expression, and </NEGATIVE> denotes an end of the expression.

Meanwhile, the opinion expression classification module 250 configured as described above can also classify linguistic features of opinion sentences, which are extracted by the opinion extraction module 140 of the apparatus 100 for extracting an opinion from a web document according to an exemplary embodiment of the present invention, into affirmative/negative opinion expressions.

In other words, the opinion expression classification module 250 detects and marks affirmative/negative opinion expressions in opinion sentences extracted by the opinion extraction module 140. Alternatively, as mentioned above, affirmative/negative opinion expressions may be marked in input sentences directly by the opinion expression classification module 250 without the opinion extraction module 140.

The opinion expression classification module 250 may be used to quantify the degrees of affirmation/negation of all words, such as compounds, general independent words, and phrases, use the quantified degrees of affirmation/negation as resources, and generate a machine learning model for detecting affirmative/negative expressions in sentences.

Additionally, the opinion vocabulary storage module 260 for storing language-unit-specific probabilities calculated by the opinion expression arithmetic module 220 as a database (DB) may be included.

Further, as shown in FIG. 6, a domain classification module 150 for classifying the data of the web documents 40a to 40n input from the opinion expression classification module 250 according to previously set domains and transferring the classified data to respective opinion expression classification modules 250a to 250n may be included.

Meanwhile, when an opinion expression model is generated using the domain classification module 150, opinion data which is input to the domain classification module 150 and in which affirmative/negative expressions are marked may be classified, and then the opinion expression classification module 250 may be implemented to have a number of one or more corresponding to respective domains.

Also, when the domain classification module 150 is prepared at the input terminal of the opinion expression arithmetic module 220, the opinion expression arithmetic module 220 may be prepared for each domain of web document data classified by the domain classification module 150.

A method of analyzing an opinion in a web document according to an exemplary embodiment of the present invention will be described in detail below.

Figure 7:
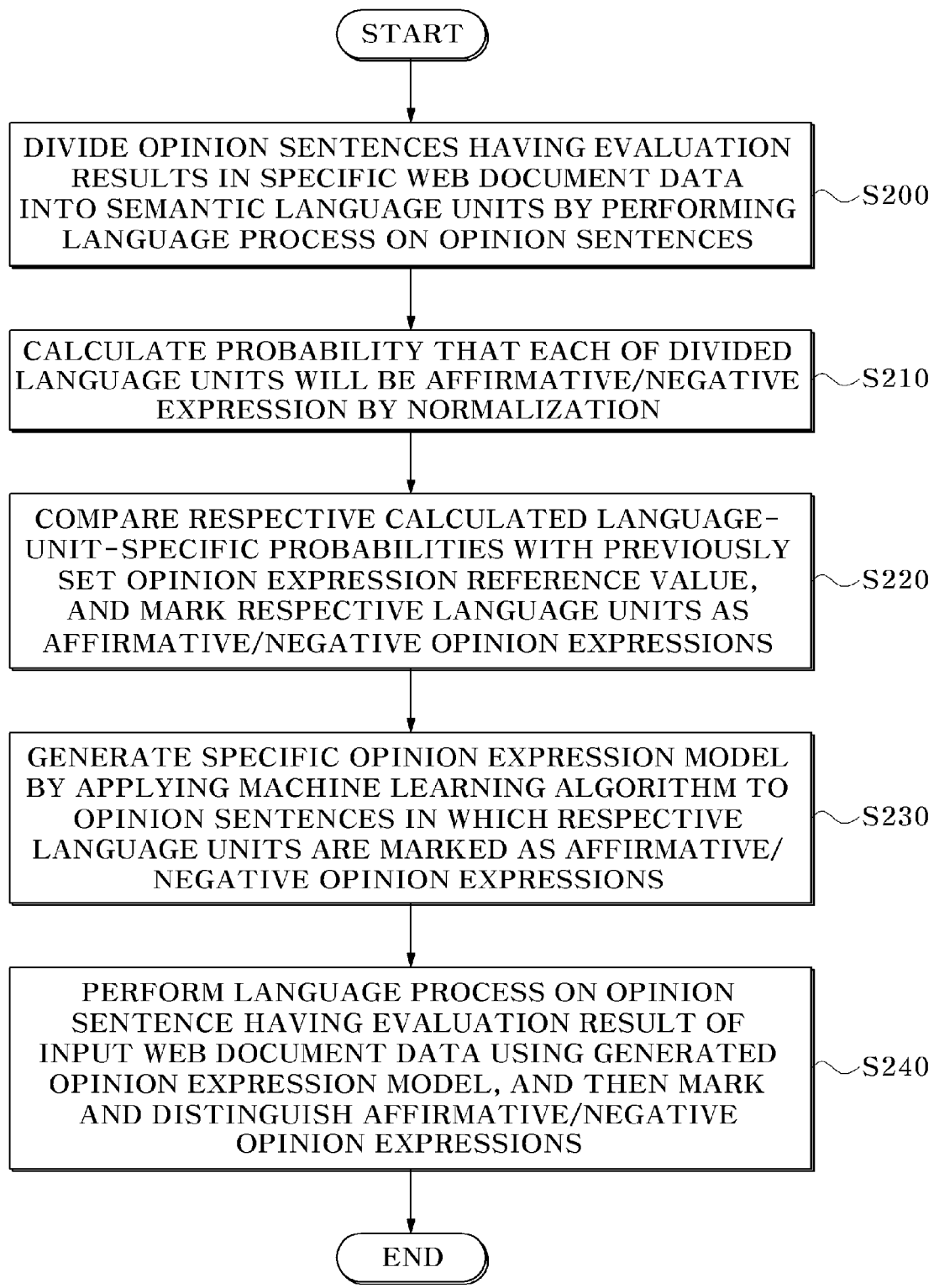
FIG. 7 is an overall flowchart illustrating a method of analyzing an opinion in a web document according to an exemplary embodiment of the present invention.

FIG. 7 is an overall flowchart illustrating a method of analyzing an opinion in a web document according to an exemplary embodiment of the present invention.

Referring to FIGS. 5 to 7, in a method of analyzing an opinion in a web document according to an exemplary embodiment of the present invention, the language processing module 210 divides opinion sentences having evaluation results in data of the specific web documents 30a to 30n into semantic language units by performing a language process (e.g., morpheme analysis or segmentation) on the opinion sentences (S200), and then the opinion expression arithmetic module 220 calculates a probability that each of the language units divided in step 200 will be an affirmative/negative expression by normalization (S210).

Next, the opinion expression marking module 230 compares the respective language-unit-specific probabilities calculated in step 210 with a previously set opinion expression reference value, and marks the respective language units as affirmative/negative opinion expressions according to the comparison results (S220), and then the opinion expression learning module 240 generates a specific opinion expression model by applying a machine learning algorithm to the opinion sentences in which the respective language units are marked as the affirmative/negative opinion expressions in step 220 (S230).

Finally, the opinion expression classification module 250 performs a language process (e.g., morpheme analysis or segmentation) on an opinion sentence having an evaluation result of data of the input web documents 40a to 40n using the opinion expression model generated in step 230, and then marks and distinguishes affirmative/negative opinion expressions (S240).

Additionally, a step of storing the respective language-unit-specific probabilities calculated in step 210 as a DB in the opinion vocabulary storage module 260 may be included.

Meanwhile, an apparatus and method for extracting and analyzing an opinion in a web document according to an exemplary embodiment of the present invention can also be embodied as computer-readable codes on a computer-readable recording medium. The computer-readable recording medium includes all kinds of recording devices storing data which can be read by computer systems.

Examples of computer-readable recording media include a read-only memory (ROM), random-access memory (RAM), compact disc (CD)-ROM, magnetic tape, hard disk, floppy disk, mobile storage device, non-volatile memory (e.g., flash memory), and optical data storage, and further include an implementation in carrier waves (e.g., transmission over the Internet).

Also, the computer-readable recording medium may be may be distributed among computer systems connected through a computer communication network and stored and executed as a code that can be read in a de-centralized method.

An apparatus and method for extracting and analyzing an opinion in a web document according to an exemplary embodiment of the present invention have been described above, but the present invention is not limited to the exemplary embodiment. The present invention can be modified in various ways and implemented within the scope of the claims, the detailed description and the appended drawings, and the modifications will fall within the scope of the present invention.

For example, an apparatus and method for extracting and analyzing an opinion in a web document are implemented based on Korean in an exemplary embodiment of the present invention, but the present invention is not limited to Korean. The apparatus and method may be implemented based on various languages, for example, English, Japanese, and Chinese.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

The invention claimed is:

1. An apparatus for extracting an opinion from a web document, comprising:
   a document collection module configured to collect specific web document data including opinion sentences;
   a language processing module configured to split the specific web document data collected by the document collection module according to sentences, and extract linguistic features by performing a language process on respective sentences;
   an opinion learning module configured to generate a specific opinion extraction model by applying a machine learning algorithm to the linguistic features of the respective sentences extracted by the language processing module; and
   one or more opinion extraction modules configured to probabilistically extract an opinion sentence from input web document data using the opinion extraction model generated by the opinion learning module; and,
   further comprising a domain classification module configured to classify the web document data input from the opinion extraction modules according to previously set domains and transfer the classified web document data to the respective opinion extraction modules.

2. The apparatus of claim 1, wherein the domain classification module includes:
   one or more document collectors configured to collect web document data relating to the previously set domains according to the previously set domains;
   one or more language processors configured to extract semantically-separable features by performing a language process on the collected domain-specific web document data;
   a domain classification learner configured to probabilistically learn the extracted domain-specific features using a machine learning classifier algorithm, and then generate a specific domain classification model; and
   a domain classifier configured to probabilistically classify the input web document data according to the previously set domains using the generated domain classification model.

3. The apparatus of claim 2, wherein domain-specific web document data collected by each of the document collectors consists of opinion data and fact data about a corresponding domain.

4. The apparatus of claim 3, wherein a ratio of the opinion data to the fact data is uniformly maintained.

5. The apparatus of claim 1 or 2, wherein the language process is morpheme analysis or a segmentation process.

6. The apparatus of claim 5, wherein, when data having undergone the segmentation process is used, the language processors extract features in at least one form among unigram, bigram, and trigram, and
   when data having undergone the morpheme analysis is used, the language processors remove at least one of a postposition, affix, pre-final ending, and final ending determined to have no specific meaning through the morpheme analysis and then extract features in at least one form among unigram, bigram, and trigram.

7. The apparatus of claim 1, wherein the language processing module splits the specific web document data collected by the document collection module and general document data including previously set opinion/fact sentences according to sentences, and extracts linguistic features by performing a language process on respective sentences.

8. An apparatus for analyzing an opinion in a web document, comprising:
   a language processing module configured to divide opinion sentences having evaluation results in specific web document data into semantic language units by performing a language process on the opinion sentences;
   an opinion expression arithmetic module configured to calculate a probability that each of the divided language units will be an affirmative/negative expression by normalization;
   an opinion expression marking module configured to compare the respective calculated language-unit-specific probabilities with a previously set opinion expression reference value, and mark the respective language units as affirmative/negative opinion expressions according to the comparison results;
   an opinion expression learning module configured to generate a specific opinion expression model by applying a machine learning algorithm to the opinion sentences in which the respective language units are marked as the affirmative/negative opinion expressions; and
   one or more opinion expression classification modules configured to perform a language process on an opinion sentence having an evaluation result of input web document data using the generated opinion expression model, and then mark and distinguish affirmative/negative opinion expressions.

9. The apparatus of claim 8, further comprising an opinion vocabulary storage module configured to store the language-unit-specific probabilities calculated by the opinion expression arithmetic module as a database (DB).

10. An apparatus for extracting and analyzing an opinion in a web document, comprising:
    a document collection module configured to collect specific web document data including opinion sentences having evaluation results;
    a first language processing module configured to split the collected web document data according to sentences, and extract linguistic features by performing a language process on respective sentences;
    an opinion learning module configured to generate a specific opinion extraction model by applying a machine learning algorithm to the extracted linguistic features of the respective sentences;
    one or more opinion extraction modules configured to probabilistically extract an opinion sentence from input web document data using the generated opinion extraction model;
    a second language processing module configured to divide the opinion sentences having evaluation results into semantic language units by performing a language process on the opinion sentences;

an opinion expression arithmetic module configured to calculate a probability that each of the divided language units will be an affirmative/negative expression by normalization;

an opinion expression marking module configured to compare the respective calculated language-unit-specific probabilities with a previously set opinion expression reference value, and mark the respective language units as affirmative/negative opinion expressions according to the comparison results;

an opinion expression learning module configured to generate a specific opinion expression model by applying a machine learning algorithm to the opinion sentences in which the respective language units are marked as the affirmative/negative opinion expressions; and one or more opinion expression classification modules configured to perform a language process on the opinion sentence having an evaluation result of the input web document data using the generated opinion expression model, and then mark and distinguish affirmative/negative opinion expressions.

11. The apparatus of claim 10, further comprising a domain classification module configured to classify the web document data input from the opinion extraction modules according to previously set domains and transfer the classified web document data to the respective opinion extraction modules.

12. The apparatus of claim 11, wherein the domain classification module includes:
one or more document collectors configured to collect web document data relating to the previously set domains according to the previously set domains;
one or more language processors configured to extract semantically-separable features by performing a language process on the collected domain-specific web document data;
a domain classification learner configured to probabilistically learn the extracted domain-specific features using a machine learning classifier algorithm, and then generate a specific domain classification model; and
a domain classifier configured to probabilistically classify the input web document data according to the previously set domains using the generated domain classification model.

13. The apparatus of claim 12, wherein domain-specific web document data collected by each of the document collectors consists of opinion data and fact data about a corresponding domain.

14. The apparatus of claim 13, wherein a ratio of the opinion data to the fact data is uniformly maintained.

15. The apparatus of claim 10 or 12, wherein the language process is morpheme analysis or a segmentation process.

16. The apparatus of claim 15, wherein, when data having undergone the segmentation process is used, the language processors extract features in at least one form among unigram, bigram, and trigram, and
when data having undergone the morpheme analysis is used, the language processors remove at least one of a postposition, affix, pre-final ending, and final ending determined to have no specific meaning through the morpheme analysis and then extract features in at least one form among unigram, bigram, and trigram.

17. A method of extracting an opinion from a web document, comprising:
(a) collecting specific web document data including opinion sentences;
(b) splitting the collected specific web document data according to sentences, and extracting linguistic features by performing a language process on respective sentences;
(c) generating a specific opinion extraction model by applying a machine learning algorithm to the extracted linguistic features of the respective sentences; and
(d) probabilistically extracting an opinion sentence from input web document data using the generated opinion extraction model; and,
further comprising probabilistically classifying the web document data input in step (d) according to previously set domains, wherein probabilistically classifying the web document data according to the previously set domains includes:
collecting web document data relating to the previously set domains according to the previously set domains;
extracting semantically-separable features by performing a language process on the collected domain-specific web document data;
probabilistically learning the extracted domain-specific features using a machine learning classifier algorithm, and then generating a specific domain classification model; and
probabilistically classifying the input web document data according to the previously set domains using the generated domain classification model.

18. The method of claim 17, wherein the language process is morpheme analysis or a segmentation process.

19. A method of analyzing an opinion in a web document, comprising:
(a') dividing opinion sentences having evaluation results in specific web document data into semantic language units by performing a language process on the opinion sentences;
(b') calculating a probability that each of the divided language units will be an affirmative/negative expression by normalization;
(c') comparing the respective calculated language-unit-specific probabilities with a previously set opinion expression reference value, and marking the respective language units as affirmative/negative opinion expressions according to the comparison results;
(d') generating a specific opinion expression model by applying a machine learning algorithm to the opinion sentences in which the respective language units are marked as the affirmative/negative opinion expressions; and
(e') performing a language process on an opinion sentence having an evaluation result of input web document data using the generated opinion expression model, and then marking and distinguishing affirmative/negative opinion expressions.

20. The method of claim 19, further comprising storing the language-unit-specific probabilities calculated in step (b') as a database (DB) in a storage module.

21. A method of extracting and analyzing an opinion in a web document, comprising:
(a") collecting specific web document data including opinion sentences having evaluation results;
(b") splitting the collected web document data according to sentences, and extracting linguistic features by performing a language process on respective sentences;
(c") generating a specific opinion extraction model by applying a machine learning algorithm to the extracted linguistic features of the respective sentences;

(d") probabilistically extracting an opinion sentence from input web document data using the generated opinion extraction model;
(e") dividing the opinion sentences having evaluation results into semantic language units by performing a language process on the opinion sentences;
(f') calculating a probability that each of the divided language units will be an affirmative/negative expression by normalization;
(g") comparing the respective calculated language-unit-specific probabilities with a previously set opinion expression reference value, and marking the respective language units as affirmative/negative opinion expressions according to the comparison results;
(h") generating a specific opinion expression model by applying a machine learning algorithm to the opinion sentences in which the respective language units are marked as the affirmative/negative opinion expressions; and
(i") performing a language process on the opinion sentence having an evaluation result of the input web document data using the generated opinion expression model, and then marking and distinguishing affirmative/negative opinion expressions.

* * * * *